May 19, 1936.  A. A. SUNDIN  2,041,621
TRANSMISSION LOCK
Filed Oct. 2, 1934
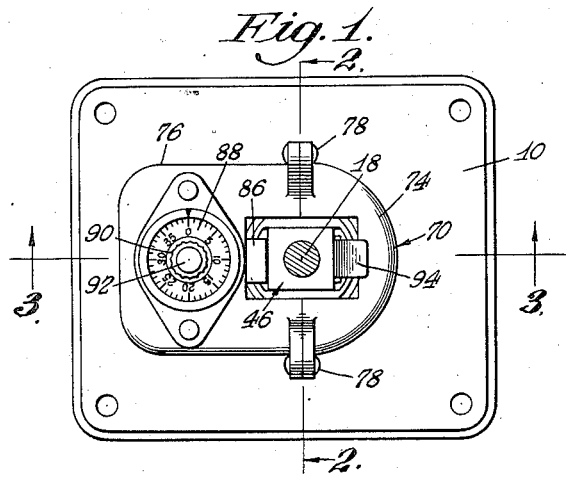
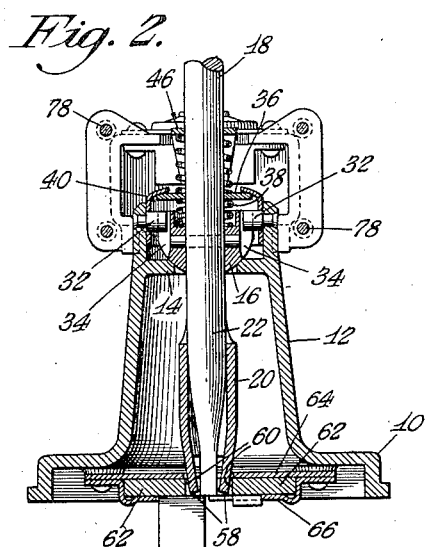
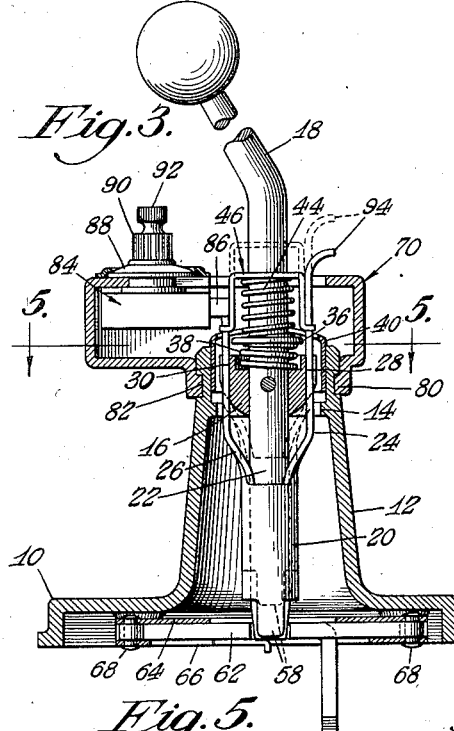
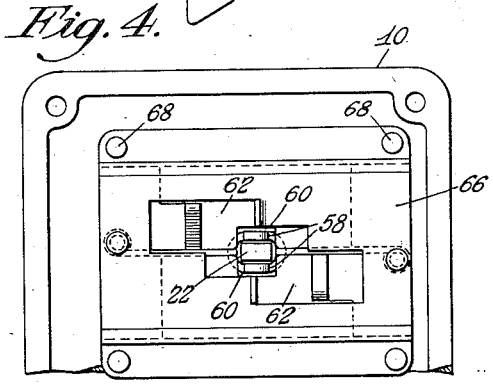
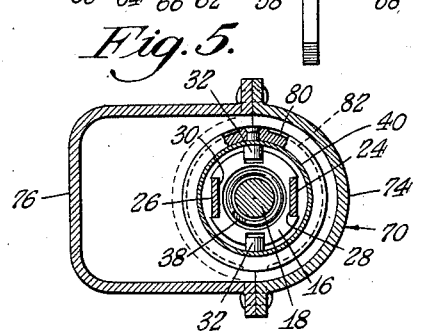
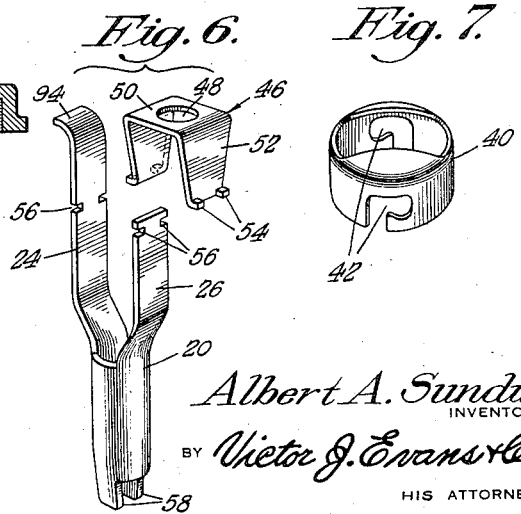
Albert A. Sundin
INVENTOR
BY Victor J. Evans & Co.
HIS ATTORNEYS Patented May 19, 1936

2,041,621

UNITED STATES PATENT OFFICE 2,041,621

TRANSMISSION LOCK

Albert A. Sundin, Chicago, Ill.

Application October 2, 1934, Serial No. 746,558

2 Claims. (Cl. 70—128)

My invention relates to transmission locks, and has among its objects and advantages the provision of an improved device for locking a gear shift lever in its neutral position.

A further object is to provide a lock applicable to gear shift levers of conventional design.

A further object is to provide a locking mechanism actuated through the medium of a combination lock.

In the accompanying drawing:

Fig. 1 is a top plan view illustrating the invention;

Fig. 2 is a sectional view along the line 2—2 of Fig. 1;

Fig. 3 is a sectional view along the line 3—3 of Fig. 1;

Fig. 4 is a bottom plan view of the transmission case cover;

Fig. 5 is a sectional view along the line 5—5 of Fig. 3;

Fig. 6 is a perspective view of a part of the invention; and

Fig. 7 is a perspective view of a latch collar.

In the embodiment selected to illustrate my invention, I make use of a conventional transmission case cover 10 having the usual hollow standard 12 provided with an integral flange 14 comprising a bearing for the swivel ball 16 carried by the gear shift lever 18.

I mount a tubular latch member 20 upon the reach 22 of the gear shift lever below the swivel ball 16. This tubular member is provided with a long reach 24 and a short reach 26 lying within recesses 28 and 30, respectively, cut in the swivel ball 16. No change is made in the swivel ball 16 other than to remove sufficient material to provide the recesses 28 and 30.

I arrange the reaches 24 and 26 in diametrically opposite relation with respect to the gear shift lever so as not to interfere with the conventional lugs 32 projecting inwardly from the hollow standard 12 and having their inner ends lying within the recesses 34 in the swivel ball 16. Two small recesses 31 are cut in the flange 14 to accommodate the reaches 24 and 26.

A washer 36 is loosely positioned upon the gear shift lever and is supported in spaced relation with the swivel ball 16 through the medium of a spring 38. A collar 40 is operatively connected with the washer 36, and is provided with bayonet slots 42 cooperating with the pins 32 for placing the spring 38 under the proper tension. The collar 40 and its associated structure is old and well known in the art.

Upon the washer 36 and about the gear shift lever 18 I mount a spring 44. A U-shaped bracket 46 is mounted upon the gear shift lever. This bracket is provided with an opening 48 in its bight 50 for the reception of the lever, and the leg parts 52 are provided with lugs 54 arranged to be positioned within recesses 56 in the reaches 24 and 26. The material of the bracket 46 is of such a nature that the legs may be flexed to permit the lugs 54 to be aligned with the recesses 56 by positioning the legs 52 between the reaches 24 and 26. After the legs 52 spring back to their original condition, the bracket 46 will be firmly connected with the reaches 24 and 26, as indicated in Fig. 3. Thus, the spring 44 is held under compression in abutting relation with the washer 36 and the bight 50.

The tubular member 20 is arranged in sliding relation with the part 22 of the gear shift lever, but the spring 44 tends to hold the member 20 in the dotted line position of Fig. 3. Any downward shifting of the member 20 from the dotted line position of Fig. 3 must be made against the tension of the spring 44.

In Fig. 3, I illustrate the position of the member 20 for locking the gear shift lever in its neutral position. At this time the fingers 58 projecting beyond the tubular member 20 are positioned within the recesses 60 in the two gear shift bars 62. These bars are of conventional design and are slidably housed between plates 64 and 66 mounted in rigid assembly upon the cover 10 through the medium of rivets 68. It will thus be seen that the fingers 58 prevent shifting of the lever 18 from its neutral position.

Means for latching the tubular member 20 in the locking position of Fig. 3 comprises a housing 70 made up of two parts 74 and 76 riveted together at 78. Before the parts are riveted together, the flanges 80 of the parts are positioned within the groove 82 cut in the outer wall of the hollow standard 12 for connecting the housing to the standard. Within the housing I position a combination lock 84 operatively connected with a latch bolt 86 arranged to project over the upper end of the reach 26 for latching the member 20 in the depressed position of Fig. 3. This combination lock comprises a dial part 88 having an operating extension 90 rotatably mounted upon a bolt actuating pin 92. This lock is of standard construction and need not be described in detail.

In Fig. 2, I illustrate the bolt 86 as extending over the end of the reach 26. I curve the end of the reach 24 at 94 to provide an operating member which may be stepped on for depressing the tubular member 20 preparatory to shifting the bolt 86 to the position of Fig. 3.

My invention is applicable to gear shift levers of conventional design by merely providing the recesses 28 and 30 in the swivel ball for receiving the reaches 24 and 26, respectively, of the tubular latch member 20 and cutting two recesses 31 in the flange 14 for accommodating the reaches 24 and 26. The small groove 82 in the tubular standard 12 provides an effective connection between the housing 70 and the standard. Of course, the patterns and molds, through the medium of which the tubular standard 12 and the swivel ball 12 are constructed, may easily be changed to provide a construction to be used in connection with my invention. The combination lock eliminates the objection to key locks because of the ease with which keys may be duplicated.

Without further elaboration, the foregoing will so fully describe my invention that others may, by applying current knowledge, readily adapt the same for use under various conditions of service.

I claim:

1. A transmission case mechanism having a pair of recessed bars shiftable mounted thereon, said transmission case mechanism including a tubular standard having a bearing in the nature of a flange, a gear shift lever having a portion arranged within the tubular standard, a swivel ball fastened to the gear shift lever and arranged in operative relation with said bearing, said gear shift lever having an end arranged in selective relation with the recesses in said gear shift bars, said bearing and said swivel ball being provided with aligned recesses, a tubular latch member slidably mounted upon the exterior of that portion of the gear shift lever positioned within the tubular standard, said latch member having reaches housed within said aligned recesses, a washer loosely mounted on the gear shift lever, a spring positioned in abutting relation with the washer and said swivel ball, means connecting the washer with the tubular standard for placing said spring under compression, a second spring mounted on said washer and about the gear shift lever, a bracket slidably mounted on said gear shift lever and upon said second spring, said bracket having lugs arranged to be positioned within recesses in said reaches, to connect the reaches the second spring and the bracket into an operative assembly, the assembly being shiftable against the tension of the second spring for positioning the tubular latch member within said recesses, to render the gear shift lever inoperative with respect to the gear shift bars, a housing mounted on said tubular standard, a lock enclosed within the housing and operable from a position exteriorly of the housing, said lock including a movable bolt arranged to be positioned in abutting relation with one of said reaches with the second spring under increased compression for holding the tubular latch member in the position rendering the gear shift lever inoperative.

2. In a gear shift lever lock, a tubular latch member slidably mounted upon the lever, said latch member including two extensions, spring means for holding the latch in an inoperative position, said spring means including a U-shaped member having an opening in its bight part for loosely receiving the gear shift lever, the ends of said U-shaped member being detachably connected with said extensions, an abutment carried by said gear shift lever, and spring means positioned between said abutment and the bight of said U-shaped member.

ALBERT A. SUNDIN.